US006393353B1

(12) United States Patent
Brocard et al.

(10) Patent No.: US 6,393,353 B1
(45) Date of Patent: May 21, 2002

(54) SELF-TESTABLE ARCHITECTURE FOR OVERSPEED LIMITATION AND CUTOFF SYSTEMS WHEN THE TURBOJET STOPS

(75) Inventors: Jean-Marie Brocard, Rubelles; Alain Pierre Garassino, Crisenoy; Christian Denis Le Boeuf, Brunoy; Alain Patrick Paya, Le Chatelet en Brie; Alain Michel Varizat, Bois le Roi, all of (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 09/527,831

(22) Filed: Mar. 17, 2000

(30) Foreign Application Priority Data

Mar. 18, 1999 (FR) .............................................. 99 03338

(51) Int. Cl.[7] .............................................. G06F 17/00
(52) U.S. Cl. ......................................... 701/99; 701/104
(58) Field of Search ........................ 701/1, 3, 99, 103, 701/104, 110; 416/25, 30, 35, 44

(56) References Cited

U.S. PATENT DOCUMENTS

| 4,493,187 A | 1/1985 | Hansen |
| 4,602,479 A | 7/1986 | Hansen |
| 4,716,723 A | 1/1988 | Ralston et al. |
| 4,954,974 A | * 9/1990 | Howell, IV et al. |
| 4,958,289 A | * 9/1990 | Sum et al. |
| 5,029,091 A | * 7/1991 | Schneider et al. |

FOREIGN PATENT DOCUMENTS

| EP | 0 293 318 | 11/1988 |
| WO | WO 99/32772 | 7/1999 |

\* cited by examiner

Primary Examiner—Tan Nguyen
Assistant Examiner—Edward Pipala
(74) Attorney, Agent, or Firm—Oblon, Spivak, McClelland, Maier & Neustadt, P.C.

(57) ABSTRACT

A hydraulic fuel control unit (100) for an aircraft engine comprises means (14, 2, 16) for controlling cutoff on stop and cutoff on overspeed of a fuel flow transferred by an output (1) to the engine injectors. A logic module (140) controls the position of a state switch (121, 143) into a test position or a normal position. The state module is managed such that the operation of the overspeed module can be tested each time the system is started on the ground. The architecture of the hydraulic unit (100) is such that operation of the cutoff on stop can be tested during each landing. Correct operation in the overspeed test and in the cutoff on stop test is observed by detecting a difference between a control value (153) of an allowable fuel flow that depends mainly on the engine speed, and a real flow value detected by sensors (22).

9 Claims, 8 Drawing Sheets

SELF-TESTABLE ARCHITECTURE FOR OVERSPEED LIMITATION AND CUTOFF SYSTEMS WHEN THE TURBOJET STOPS

FIELD OF THE INVENTION

This invention is in the field of cutoff on stop and cutoff on overspeed devices for a turbojet and means of testing these two cutoff modes.

TECHNOLOGICAL BACKGROUND

A turbojet necessarily has a device for cutting off the fuel supply directly from the pilot's position in the aircraft on which the turbojet is fitted. This is a regulatory requirement.

This method of cutting off the turbojet is called cutoff on stop.

The set of equipment elements that contributes to operation of the cutoff on stop is called the cutoff on stop system.

Secondly, a turbojet must be fitted with a device to protect it against excessive rotation speeds (overspeed), particularly to prevent explosion of the turbine disks.

This is also a regulatory requirement.

This turbojet protection method is called the overspeed protection.

The set of hardware and software elements that contributes to operation of the overspeed protection is called the overspeed protection system.

Cutoff on stop is controlled from the pilot's position in the aircraft by means of an engine stop handle called the master lever. The master lever may be the same as the throttle handle, the cutoff position then corresponding to a particular position of this handle.

The cutoff on overspeed is automatic and takes place after it is detected that the engine shaft rotation speed is greater than the maximum allowable rotation speed by a predetermined percentage.

The overspeed may be detected at the low pressure coupling and in this case we refer to the number of revolutions $N_1$, or at the high pressure coupling and in this case we refer to the number of revolutions $N_2$. Overspeed is detected by capturing a magnitude that varies with $N_1$ or $N_2$.

According to the regulations, cutoff on stop and cutoff on overspeed must be tested between landing and the next takeoff.

According to one known technique, the overspeed test is made by acting on the overspeed protection system that is tripped when the engine is stopped after landing. This is achieved by changing the trip value for this protection to a value of the rotation speed less than the engine idle speed, either using a computer controlling the engine, or mechanically by changing the setting of a spring. If the engine stops, correct operation of the overspeed protection system is demonstrated and it is thus tested after every flight.

The cutoff on stop system is verified during a maintenance operation.

The invention consists of modifying and adapting the architecture of the hydromechanical fuel regulator, the architecture of the logic of the engine regulation computer and the architecture of the turbojet overspeed detection boxes.

Thus, adaptation of the operating architecture and logic is a means of automatically testing that the entire overspeed system is operating correctly immediately before the turbojet is started.

It is also a way of testing operation of the cutoff on stop system when the turbojet is stopped after landing.

Consequently, the combination/optimization of the hydromechanical fuel regulator architecture with the architecture of the electronic system is a means of automatically and completely (100% coverage ratio) testing that the two systems (overspeed protection and cutoff on stop) are working correctly.

Thus, the invention relates firstly to a device for controlling and testing an aircraft engine cutoff on stop system, the engine comprising means of regulating the fuel flow input to engine injectors, these means calculating an allowable flow of fuel to sensors determining the value of the real instantaneous flow value input to engines, a means of closing the fuel inlet to engine injectors that is normally open and closes under the action of controllable actuation means, the device being characterized in that the engine cutoff on stop is obtained by pulling a master lever that can be manually moved from a first position into a second position, the changeover to this second position actuating means of closing off the fuel supply, and in that the correct operation test of this cutoff on stop consists of measuring the difference between the fuel flow authorized by the engine regulation means and the real fuel flow measured by sensors determining the real instantaneous flow value.

The invention also relates to an overspeed protection device for an aircraft engine, the engine comprising means of regulating the fuel flow input to the engine injectors, these means calculating an allowable fuel flow as a function of the engine rotation speed and external parameters, sensors sensing the real value of the instantaneous flow input to engines, a means of closing the fuel flow into the engine injectors, this means being normally open and closing under the action of controllable actuation means, means of measuring the instantaneous rotation speed of the engine, means of fixing instantaneous rotation speed thresholds that constitute detection of an overspeed if exceeded, a first threshold forming the overspeed in test threshold, and a second threshold forming the real overspeed threshold, device characterized in that the real overspeed or the test overspeed is detected in a logic electronic module into which a magnitude is input representing the value of the real instantaneous rotation speed of the engine, this module comprising a state switch that can be in at least two states, a test state and a normal state, this module making a comparison between the real rotation speed and the test overspeed threshold when the state switch is in the test state, and between the real rotation speed and the real overspeed threshold, when the state switch is in the normal state, this module outputting a closing command to the means of actuating the fuel inlet closing device, and in that the correct operation test of engine cutoff on overspeed consists of measuring the difference between the fuel flow authorized by engine control means and the real fuel flow measured by the sensors of the real value of the instantaneous fuel flow sensors.

A detailed example of an embodiment of the invention will now be described with respect to the attached drawings in which:

FIG. 1 shows the part of a hydraulic fuel control unit 100 helpful to understanding the invention.

Figure 1:
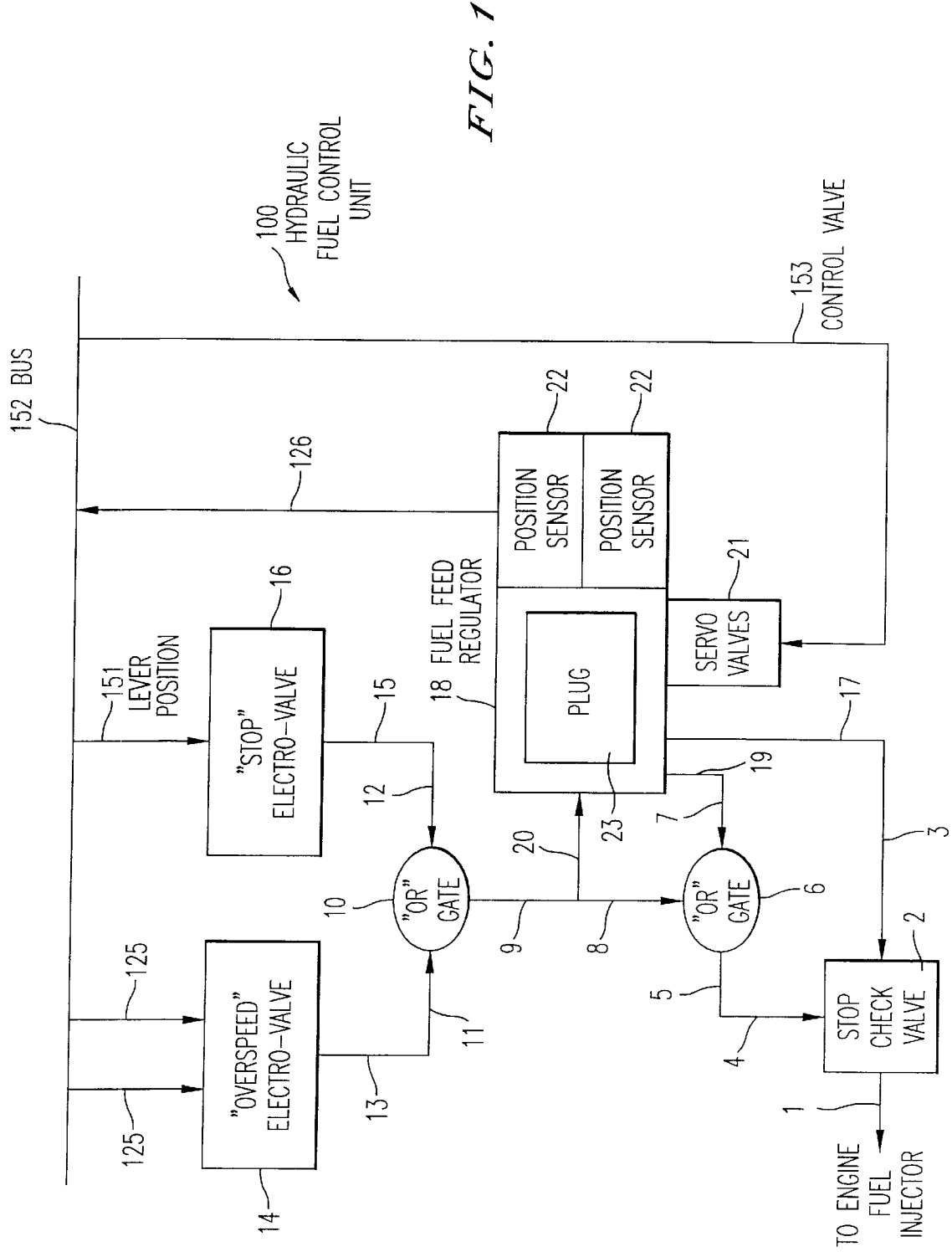
FIG. 1 represents a diagram of the hydraulic architecture of cutoff on stop and cutoff on overspeed systems.

This unit controls the fuel flow WE that is sent to fuel injectors not shown at the outlet 1 from a stop valve 2. The stop valve has two inlets, namely a first inlet 3 and a second inlet 4. Its behavior is as follows. When sufficient pressure is applied at inlet 4, the valve is closed. Outlet 1 is no longer supplied. When the fuel inlet pressure at the first inlet 3 is insufficient, in other words is below a minimum threshold value, the stop valve 2 is closed and the outlet 1 is no longer supplied. When the pressure at the first inlet 3 of the delivery pump 2 is below the threshold and the second inlet 4 is not supplied, the entire flow that enters at inlet 3 is directed to outlet 1.

The internal layout of such a valve 2 to obtain the behavior described above is known in itself and will not be described. There is a pipe between the second inlet 4 to valve 2 and the outlet 5 from a first "or" hydraulic gate 6 with two inlets, a first inlet 7 and a second inlet 8. This "or" gate 6 directs fuel received from either of its two inlets 7, 8 to its outlet 5. The internal operation of this type of gate is known in itself and will not be described herein. However, note that in its simplest form, it may be a simple fitting.

The second inlet 8 to the first "or" gate 6 is connected to an output 9 from a second "or" gate 10. This second "or" gate 10 has two inputs, a first 11 and a second 12.

The first inlet 11 is connected to an outlet 13 from a first electro-valve 14. It will be mentioned later that this first valve is a closing valve for the stop check valve 2 in case an overspeed is detected or for an overspeed test.

The second inlet 12 to the "or" hydraulic gate 10 is connected to an outlet 15 from a second electro-valve 16. As will be seen later, this second valve is the closing stop valve.

The first inlet 3 to the stop valve 2 is connected through a pipe to a first outlet 17 from a fuel delivery pump 18. This first outlet 17 is the normal outlet from the delivery pump 18, in other words the outlet into which the fuel flow $W_E$ to injectors arrives as long as operation takes place under normal safety conditions. A second outlet 19 from the delivery pump 18 is connected through a pipe to the first inlet 7 of the first hydraulic "or" gate 6. This second outlet 19 from the delivery pump 18 transmits a stop signal in the form of a fuel pressure when the delivery pump 18 is in the minimum flow position.

This minimum flow position is reached particularly due to the fact that a logical input 20 of the delivery pump 18 connected to the output 9 from the second "or" gate 10 receives input in the form of a fuel pressure from outlet 9 from this second "or" gate 10.

In a known manner, the feed regulator 18 comprises a plug 23 as shown schematically in FIG. 1, the movement of the plug modifies the cross-sectional area of the fuel directed towards outlet 17. A proportionality valve, not shown, maintains a constant pressure difference between a fuel high pressure inlet not shown, and the outlet 17. Similarly in a known manner (not shown) a regulating pressure relief valve returns fuel flow in excess of the flow $W_E$ supplied to the feed regulator by a high pressure pump.

During normal operation, a servovalve 21 moves the plug 23 to obtain the fuel flow $W_E$ necessary for operation of the engine considering the instructions of a pilot and external parameters. The position 126 of the plug 23 is known due to position information output by redundant position sensors 22. This information is processed by a control device not shown that also receives information about flight controls and conditions. This control device outputs a control an 15 signal 153 to redundant servovalves 21, which control the position of the plug 23 of the delivery pump 18 to adapt it to the engine speed.

This normal part of operation and regulation of the fuel flow is known in itself, and does not affect this invention. Note that this invention is applicable to the cutoff on stop and stop on overspeed field and testing of these two functions.

Figure 2:
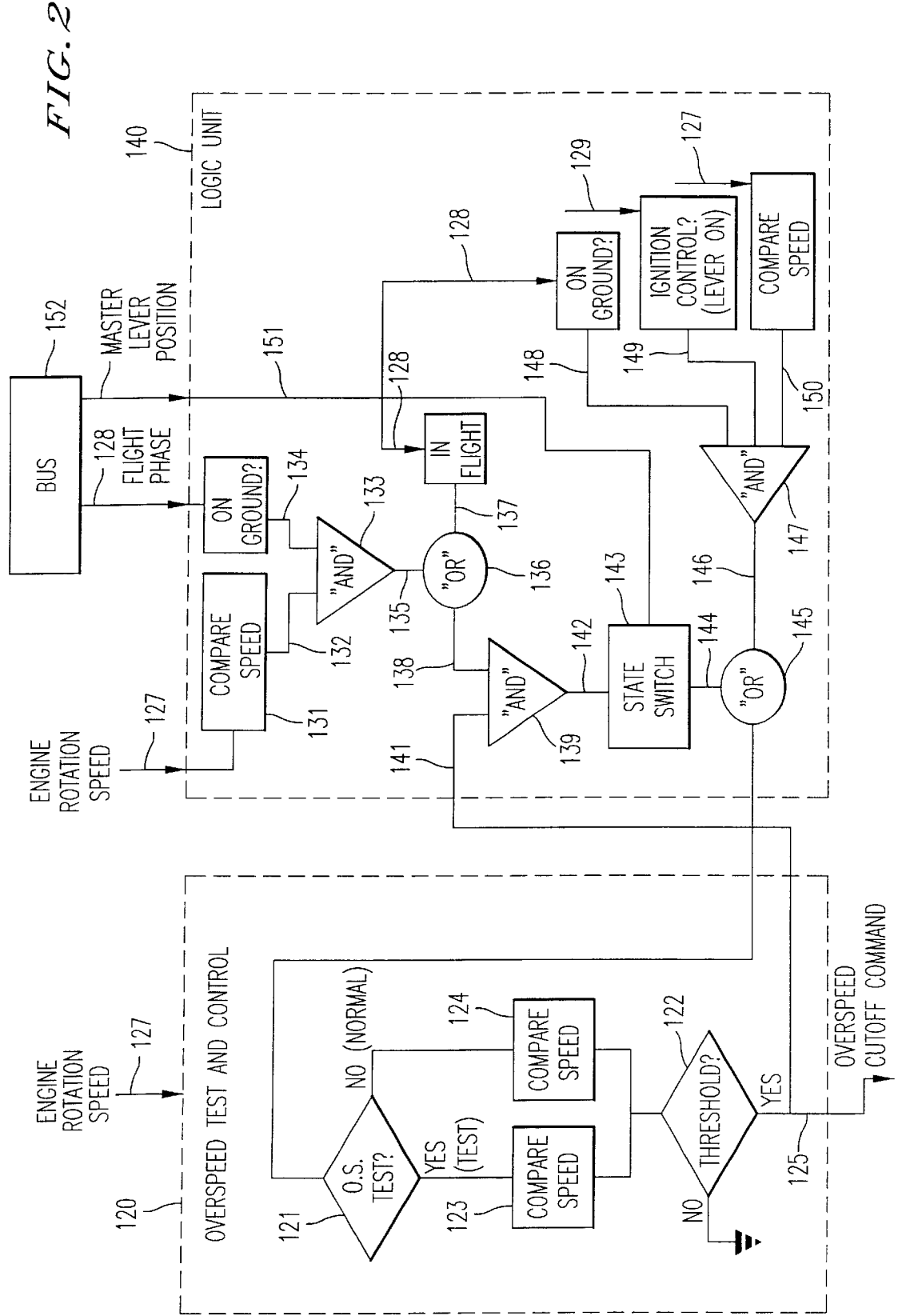
FIG. 2 shows a diagram of a logic architecture for the control of hydraulic means represented in FIG. 1.

The logic electronic modules 120 and 140 for controlling and testing the fuel control unit 100 for the cutoff on stop, stop on overspeed and for testing these functions will now be described with relation to FIG. 2.

In order to facilitate understanding of the invention, note that the first step in starting up of a turbojet in a known manner is assisted rotation of the compressor and the turbine. When the aircraft is on the ground, this rotation is started by means of a drive device, for example an electronic starter or a fan. When the aircraft is in flight, the relative air speed acts as a fan. Injection and fuel ignition only start when the jet has reached a threshold rotation speed, equal to $V_a$ if the aircraft is on the ground, or $V_{min}$ if the aircraft is in flight, to provide sufficient air flow at the turbine. The increase in the rotation speed can then continue without external assistance due to the energy supplied by combustion of the fuel.

The overspeed test and control module 120 will now be described.

A value 127 representative of the engine rotation speed, for example the speed of the low pressure coupling $N_1$ or the high pressure coupling $N_2$, or any other value representative of an engine rotation speed within the range of values in which the overspeed to be detected is located, is input into this module.

According to a first logical operation 120, the question "are we in an overspeed test phase?" is asked. The response to this question is obtained by checking a state switch or a state memory 143. In the example commented on herein, a value 1 corresponds to a positive response.

If the response is positive, the next question asked in a module 122 is whether the rotation speed is greater than a threshold value. The response to this question is obtained by comparing the real value 127 of the received rotation speed, with a threshold value. When the current phase is a test phase, the comparison is made in a first comparison module 123. The threshold rotation test speed $V_{st}$ is the rotation speed, below the real value $V_{av}$, at which the real overspeed is reached. This test speed according to the invention is chosen to be less than the rotation speed $V_a$ starting from which fuel inlet into the injectors is authorized, when the aircraft is on the ground.

In the example commented on herein, the value $V_{at}$ of the threshold rotation speed for the test was fixed at 10% of the maximum rotation speed authorized on the ground. The fuel inlet speed is equal to 22% of this value.

If the response output from module 121 is no, then the current phase is not a test phase, and the response will be asked in module 122 if the rotation speed is greater than a threshold value. In this case, a comparison between the real speed and real overspeed threshold $V_{EV}$ is carried out in a second comparison module 124.

In the example given herein, the real overspeed value is equal to 107% of the maximum allowable value considering external parameters. Similarly, this example refers to a comparison module and not a comparator since the comparison is made by a logical operation. Naturally, this could be an analog comparator. If the response output from module 122 is positive, which means that it is above the test or real overspeed, a command 125 is sent to the electro-valve 14 of the hydraulic unit 100 to open this valve and a positive signal is sent to an "and" gate 139 that will be discussed later.

Thus, it can be seen that the overspeed module 120 is a module into which the engine rotation speed is input. This module continuously performs a routine to determine if the real rotation speed is greater than a threshold, this threshold being the test overspeed threshold or the real overspeed threshold depending on the state of a state switch 123 that will be discussed later. The state of the state switch 123 changes from the test state, for example the value 1, to the non-test state, for example the value 0. A logic module 140 manages state changes of the state switch.

The logic module 140 will now be described. This module receives information 127 about the rotation speed, information 128 about the flight phase in order to know if the aircraft is in flight or on the ground, and information 151 about the position of the master lever, for example through a bus 152 in the ARINC format. It will be seen later that the information 151 is used as a control signal for the cutoff in stop electro-valve 16. A first comparison module 131 of the logic module 140 makes the comparison between the speed 127 and the rotation speed starting from which fuel can be inlet into engine injectors. The output 132 from this comparison forms a first input for the first logical "and" gate 133. A second input 134 to this "and" gate receives positive information when the aircraft on which the engine is fitted is on the ground. The "and" gate 133 outputs a positive input, for example, if the engine rotation speed is greater than the fuel inlet threshold into the injectors and if the aircraft is on the ground. The output 135 from the first "and" gate 133 is input to a first "or" logical gate 136. A second input 137 into this "or" gate 136 receives positive information when the aircraft is in flight. Thus, the output from the "or" gate 138 is positive if the aircraft is on the ground and if the engine rotation speed is greater than speed $V_a$, or in all cases if the aircraft is in flight. The output 138 from the first "or" gate 136 forms a first input to a second "and" gate 139. The second input 141 to the "and" gate 139 receives the response 125 at the output from comparison module 122. If this output is positive, in other words if the number of revolutions is greater than the real overspeed threshold or the test overspeed threshold, the output 142 from the second "and" gate 139 is positive, which changes the value of the state switch 143 that was already mentioned above during the description of module 120. This state module is reinitialized to its test value every time that the master lever is switched to the on position with the aircraft being on the ground. The output 144 from this state switch forms an input to a second "or" gate 145. The second input 146 to the second "or" gate 145 forms the output from a third "and" gate 147. This "and" gate has three inputs 148, 149, 150. The first input 148 is positive if the aircraft is on the ground. The second input 149 is positive is the engine ignition control is positive. The third input 150 is positive if the rotation speed is greater than the threshold above which fuel can be distributed to the injectors.

Figure 3A:
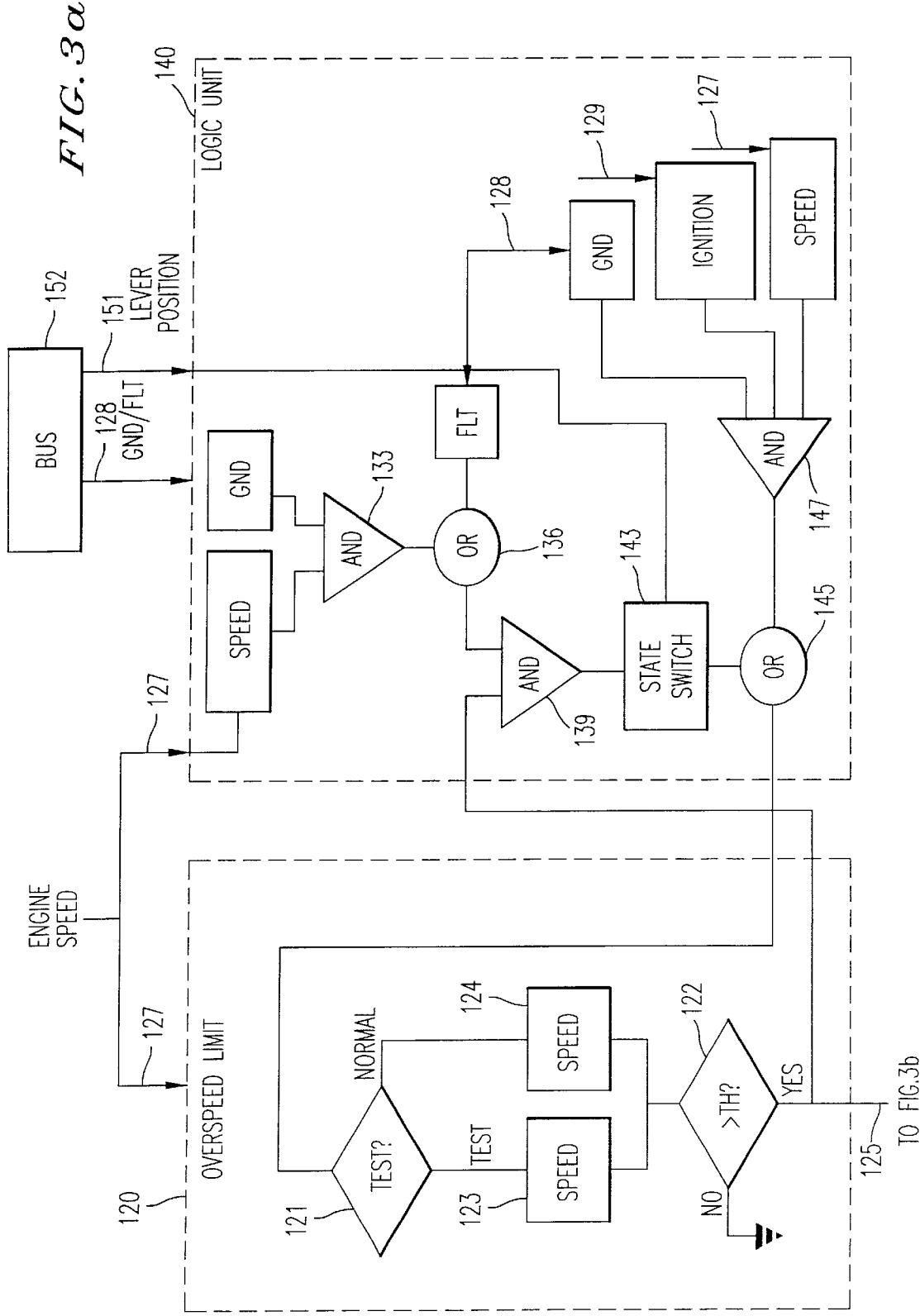
FIG. 3 shows links between the logic architecture and the hydraulic architecture.
Figure 3B:
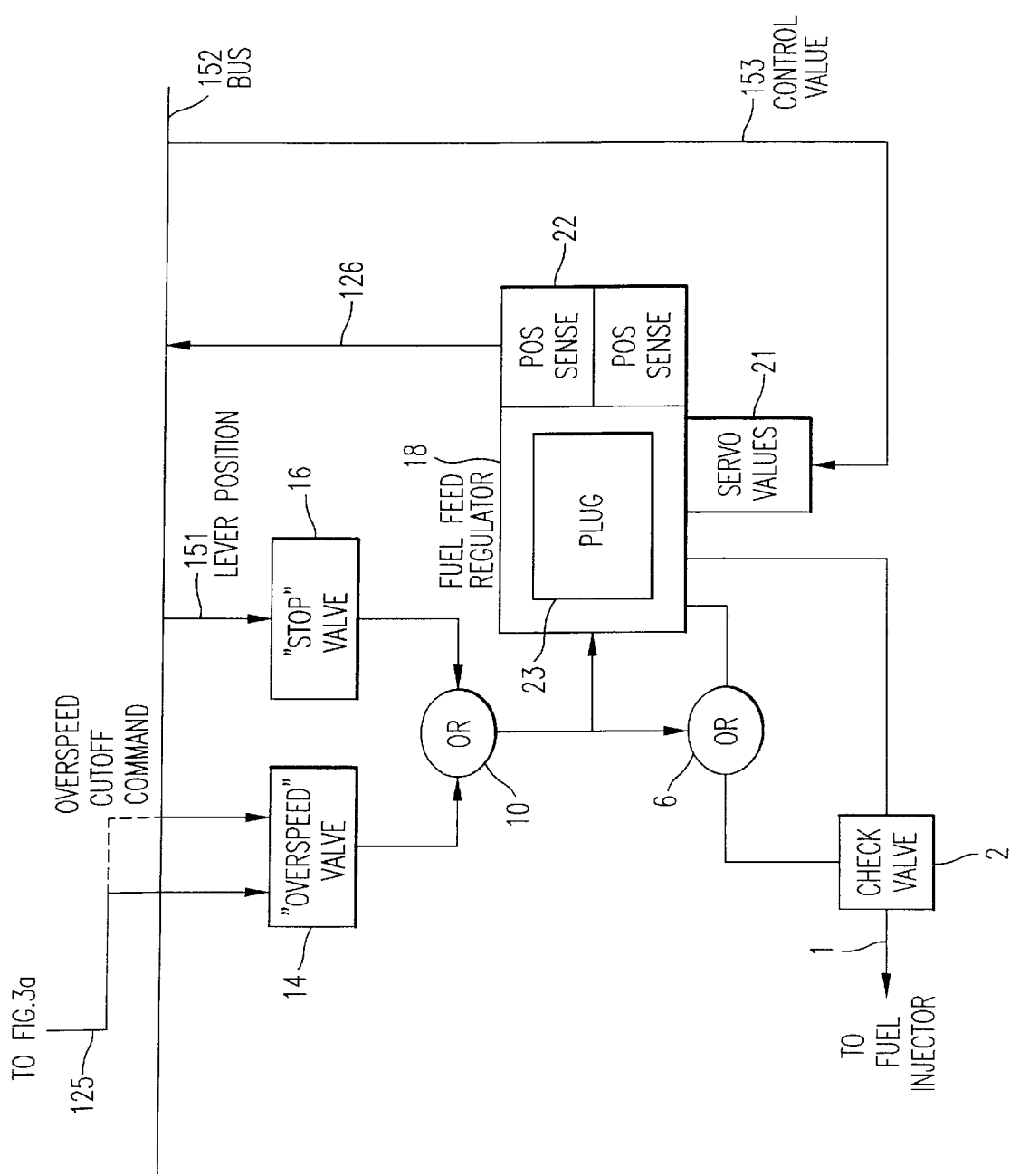

Before describing the global operation of logic modules 120, 140 and the fuel control unit 100 in relation to FIG. 3 in which these three elements are shown, note that: check valve 2 is closed by:

either opening the stop electro-valve 16, or by opening the overspeed electro-valve 14, or by the feed regulator 18 being in the minimum stop position called the stop signal.

The electro-valves 14, 16 are of the monostable type without self-hold.

If one of the two electro-valves 14, 16 is opened, the delivery pump 18 is closed at the minimum stop regardless of the command from the computer controlled by the servovalve 21.

The information about the state of stop valve 2 (open/closed) is obtained by the position of the feed regulator 18 sensed by position sensors 22. Feed regulator 18 being at the minimum stop means that check valve 2 is closed, and feed regulator 18 not being at the minimum stop means that the check valve 2 is open.

Operation of the invention as described above in the cutoff on stop and cutoff on overspeed phases or during the test of these phases, will now be described.

The four fundamental operating sequences related to the invention are:

start sequence on the ground with test of the overspeed system, stop sequence with test of the cutoff on stop system, stop in flight sequence on pilot error then re-ignition without test, stop in flight sequence if the overspeed protection is tripped, then re-ignition without test if requested by the pilot.

The correct operating test of the overspeed protection system is only made when starting on the ground and not during re-ignition in flight. This is necessary to avoid making ignition of the turbojet in flight more difficult.

Operation of each of these sequences will be described in relation with FIG. 3 and with each of the time diagrams in FIGS. 4, 5, 6 and 7 respectively.

On each of these diagrams:

line a represents the variation of the engine rotation speed; the speeds used to describe operation of the invention in these various phases are as follows, in increasing order:

$V_{min}$ minimum speed necessary for ignition in flight, $V_{st}$ test overspeed threshold, $V_a$ minimum speed for authorization of ignition on the ground, $V_r$ idle speed, $V_n$ speed in cruising flight $V_{sv}$ real overspeed threshold.

These speed values are stored in memory or are imported by bus 152, in a known manner.

line represents the flight control from the master lever activated by the pilot. Note that in the example described, the on position corresponds to an electrical signal not being sent, represented by a low position;

line c represents the electro-valve 16 in the closed in stop position; the value is high if the valve is open or low if it is closed;

line d represents the value of the test variable (1 or 0);

line e represents the value of the overspeed detection threshold (real threshold or test threshold);

lines f and g represent the value of the control signal to close the electro-valve 14 in overspeed and the position of the said electro-valve 14 respectively, the value is high is the valve is open and low if it is closed;

line h represents the position of the delivery pump 18, this position varying between a position controlled by the flight computer and obtained using the servovalve 21 and a position at minimum stop controlled by modules 120 and 140 and obtained by means of electro-valves 14 and 16;

line i represents the position of the stop valve 2 (open or closed).

Figure 4:
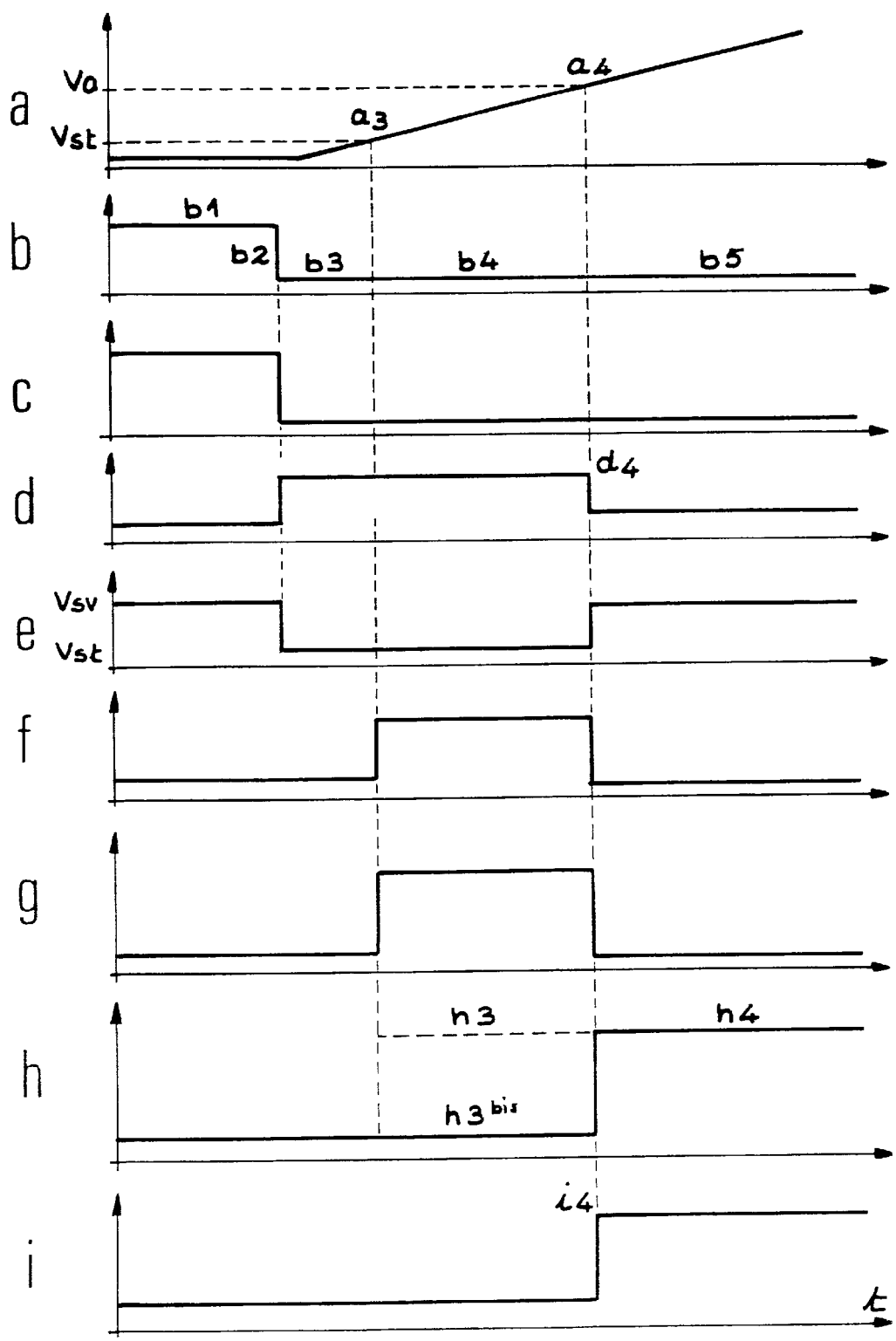
FIG. 4 shows a chronology of a start up sequence on the ground including a test of the overspeed system.

The start sequence on the ground with a test of the stop on overspeed system will now be described in relation to FIG. 3 and the time diagram shown in FIG. 4.

On line b, for a first interval b1, the engine is at rest and the master lever is in the non-ignited position, which as mentioned above will result in a high electrical signal.

The pilot moves the master level at time b2. The engine starts to turn. At time a3 marked by a vertical dashed line on the diagrams for lines a to h, the engine reaches the test threshold speed $V_{st}$ that was defined for the overspeed test.

At time a4, marked by a second vertical dashed line on lines a to i, the engine reaches speed $V_a$ at which fuel can be sent to the injectors on the ground.

We will now examine how the structure shown in FIG. 3 behaves at these various times.

At time b2, the state change of the master lever creates a command 151 inside the logical unit 140 that will initialize the state switch 143 in a test position, for example in state 1 (line d). This same command 151 will act on the close on stop electro-valve 16 to move it from an initial open position to a closed position (line c). The limiting overspeed is changed to the test speed $V_{st}$ (line e). Since the switch 143 was equal to a value of 1, the comparison will be made in module 123. These various actions are materialized on lines d, c and e respectively.

When the engine reaches the test overspeed threshold Vst at time a3, the output signal from module 122 trips (line f) and for example changes to 1. The overspeed protection electro-valve 14 that is initially closed (line g) receives an open command and opens (line g). This does not change the position of the stop valve 2 through the "or" gates 10 and 6 since it is closed. It therefore remains closed.

Correct operation of the overspeed protection system is observed by observing what happens at the position of the plug 23 of delivery pump 18 shown on line h.

The delivery pump 18 receives a set position corresponding to the on position, when the engine reaches the test overspeed. This position is shown at h3 by a horizontal dashed line.

Opening of the overspeed protection electro-valve 14 acts through an "or" gate 10 and the delivery pump inlet 20 to put the plug 23 into a position that takes priority over the order from the computer to move into the minimum open position, which causes the stop valve 2 to close through the output 19 from delivery pump 18 and the "or" gate 6. Thus, if the position detected by the position sensors 22 is the set position sent by the computer represented by the horizontal dashed line h3, it will be known that something is wrong in the stop on overspeed system and the pilot will be informed. If the overspeed protection system is operating, then the position sensors 22 record the h3bis position, minimum stop position.

When the engine rotation speed reaches the ignition speed $V_a$, the aircraft still being on the ground, the inputs 148 (aircraft on the ground) and 149 (master lever in on position) and 150 (engine speed greater than ignition speed) are all positive and consequently the output 146 from the "and" gate 147 is positive. The value of the state switch 143 is corrected to 0 line d phase d4. In module 121, the test value is no longer equal to 1, consequently the result is on the output line corresponding to a no response from module 121. The overspeed comparison is made with the real overspeed and not the test speed (line e). The output from module 122 is no longer positive and consequently, the control signal from the overspeed electro-valve 14 is corrected to 0, line f and electro-valve 14 closes (line g).

When valves 14 and 16 are closed, the position of plug 23 of the feed regulator 18 returns to the set position output by the computer at h4 line h. Since the plug 23 is no longer at the minimum stop, the output pressure 17 from the feed regulator 18 is sufficient to open check valve 2, i4 line i. Since the check valve is open, fuel reaches the injectors.

Thus it can be seen with the adopted architecture, that all start up phases on the ground include a test of the overspeed protection system.

Note that a delivery pump servocontrol failure monitoring function must be inhibited during this test, and particularly during phases h3 and h3bis. The overspeed protection system is verified by the difference between the computer set value and the real delivery pump position given by the sensors 22.

Operation of the device shown in FIG. 3 during a stop sequence for an engine on the ground with the cutoff on stop test will now be discussed in relation with FIG. 5.

Figure 5:
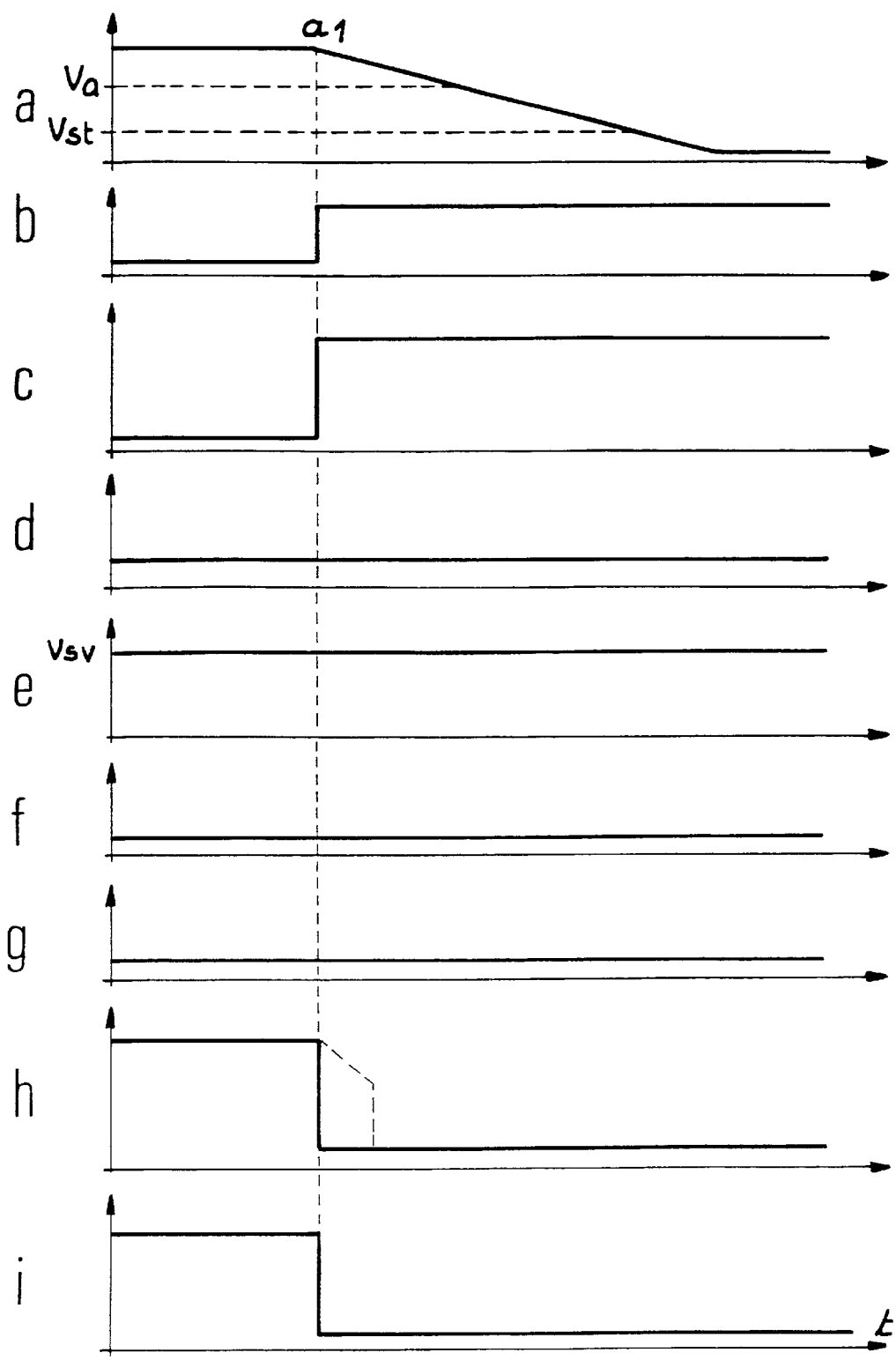
FIG. 5 shows the chronology of a ground stopping sequence including a test of the cutoff on stop system.

On line a, when the engine is rotating at idle speed $V_r$, the pilot tilts the master lever to the engines cutoff position at a time a1 marked by a downwards dashed line in FIG. 5.

At the same time, the aircraft electrical signal at line b passes from the low position to the high position.

On line c, the cutoff on stop electro-valve 16 receives the open command 151 and opens.

The value of the state switch 143 line d does not change and remains equal to 0 since the output 146 from the "and" gate 147 changes from the value 1 to 0 without returning to the value 1. There is always one input to the "and" gate 147 that is not positive after the master lever has been put into the "off" position. At idle speed, the rotation speed $V_r$ is greater than the minimum speed $V_a$ to enable fuel inlet to the injectors. When it drops below, the master lever is on the off position. There is no longer any state change at the "and" gate 133.

Consequently, the overspeed threshold on line e remains at its real value. The control signal for the overspeed electro-valve 14, line f, and therefore the position of the electro-valve, line g, do not change.

However, since the cutoff on stop valve 16 remains open, line c, the feed regulator 18 receives a priority set value forcing it to move plug 23 into the minimum stop position. This displacement, sensed by sensors 22 is shown as a solid line h. It is not the same as the displacement that would already have been made, if the position of the plug 23 had followed the set value given by the computer to the engine. This set position, corresponding to a gradual reduction in the fuel flow following the reduction in the engine rotation speed, is shown in dashed line h.

The difference between these two positions of the plug 23 of the feed regulator 18 is used to verify that the cutoff on stop system is working correctly.

Finally, on line i, the stop valve closes at a time a1 due to the command received by the output 17 from feed regulator 18.

Thus, it can be seen that the cutoff on stop test is carried out each time that the engine is stopped on the ground, and that the overspeed test is carried out at each startup on the ground. There is no longer any need to perform any particular maintenance operations to carry out the two tests.

Figure 6:
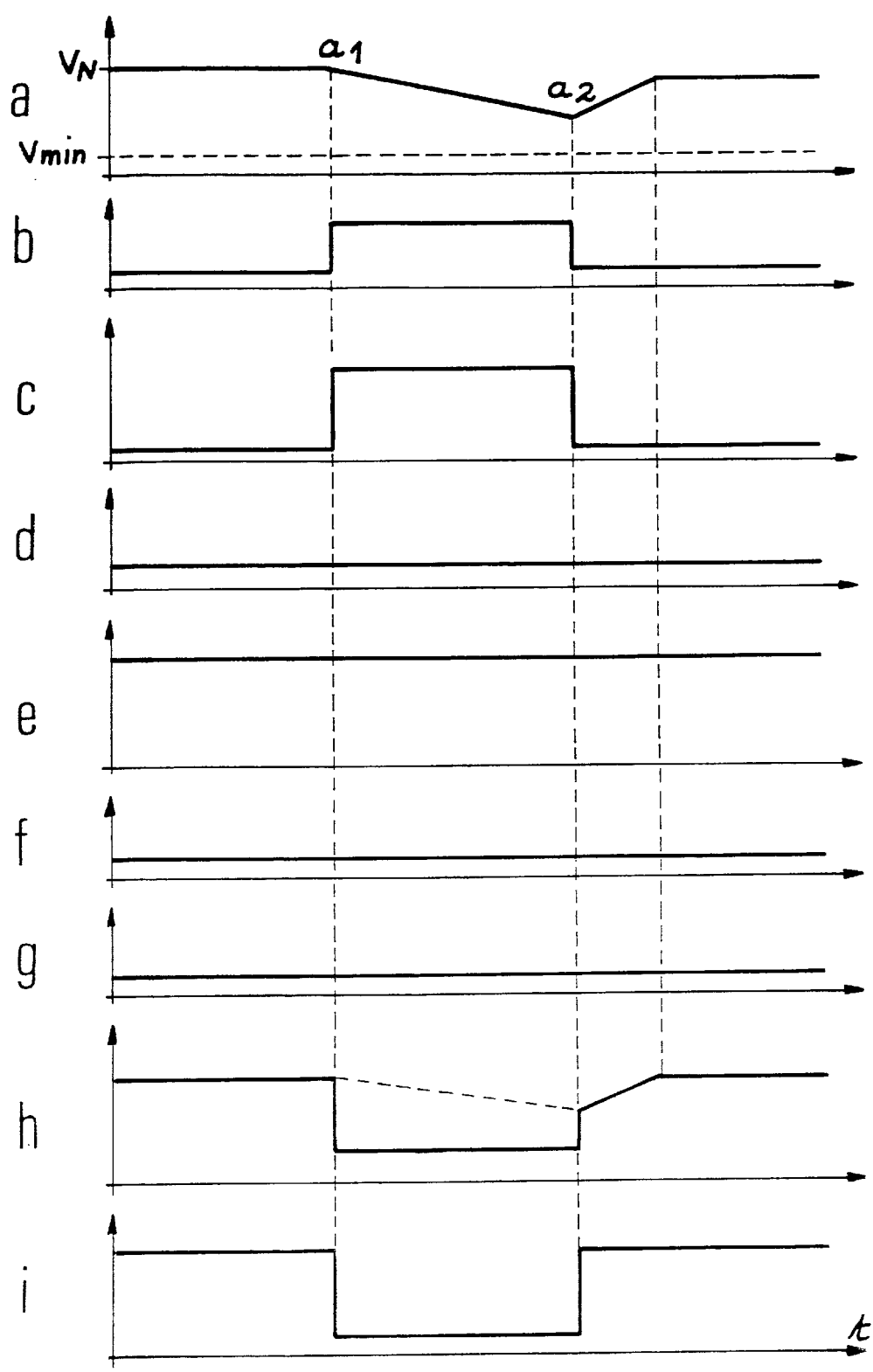
FIG. 6 shows a chronology for a stop in flight following a pilot error, then re-ignition without an overspeed test.

We will now describe operation of the device shown in FIG. 3 during a cutoff in flight sequence following a pilot error followed by re-ignition without test. The time diagram for this sequence is shown in FIG. 6.

On line a, the engine is rotating at the beginning of a sequence at cruising rotation speed $V_a$. At time a1, for example following an error, the pilot stops the engine. The engine rotation speed reduces down to time a2 when the pilot decides to re-ignite the engine.

On line b, the aircraft/electrical signal changes from the off position before time a1, to the on position after time a1 and then once again to the off position after time a2.

In line c, the position of the cutoff on stop electro-valve 16 changes under the effect of the successive commands received at a1 and a2, changing to the closed position to the open position at time a1 and then to the closed position at time a2.

As in the previous sequence and for the same reasons, there is no change in the overspeed detection threshold state switch line d, the overspeed cutoff electro-valve 14 control and position signal line e, or lines f and g.

Starting from time a1, the position of the plug 23 is no longer controlled by the servovalve 21 since, due to the cutoff on stop electro-valve 16 being opened, the plug 23 is moved to the minimum stop position, which has the effect of closing the stop valve 2, line i. The position of the plug 23 of the feed regulator 18, line h, in response to the computer set value, is shown in dashed line; it depends on the real engine rotation speed. At time a2, due to closure of the cutoff on stop electro-valve 16, line c, the servovalve 21 resumes control of the position of the plug 23 of feed regulator 18, which has the effect of opening the stop valve 2, line i.

Figure 7:
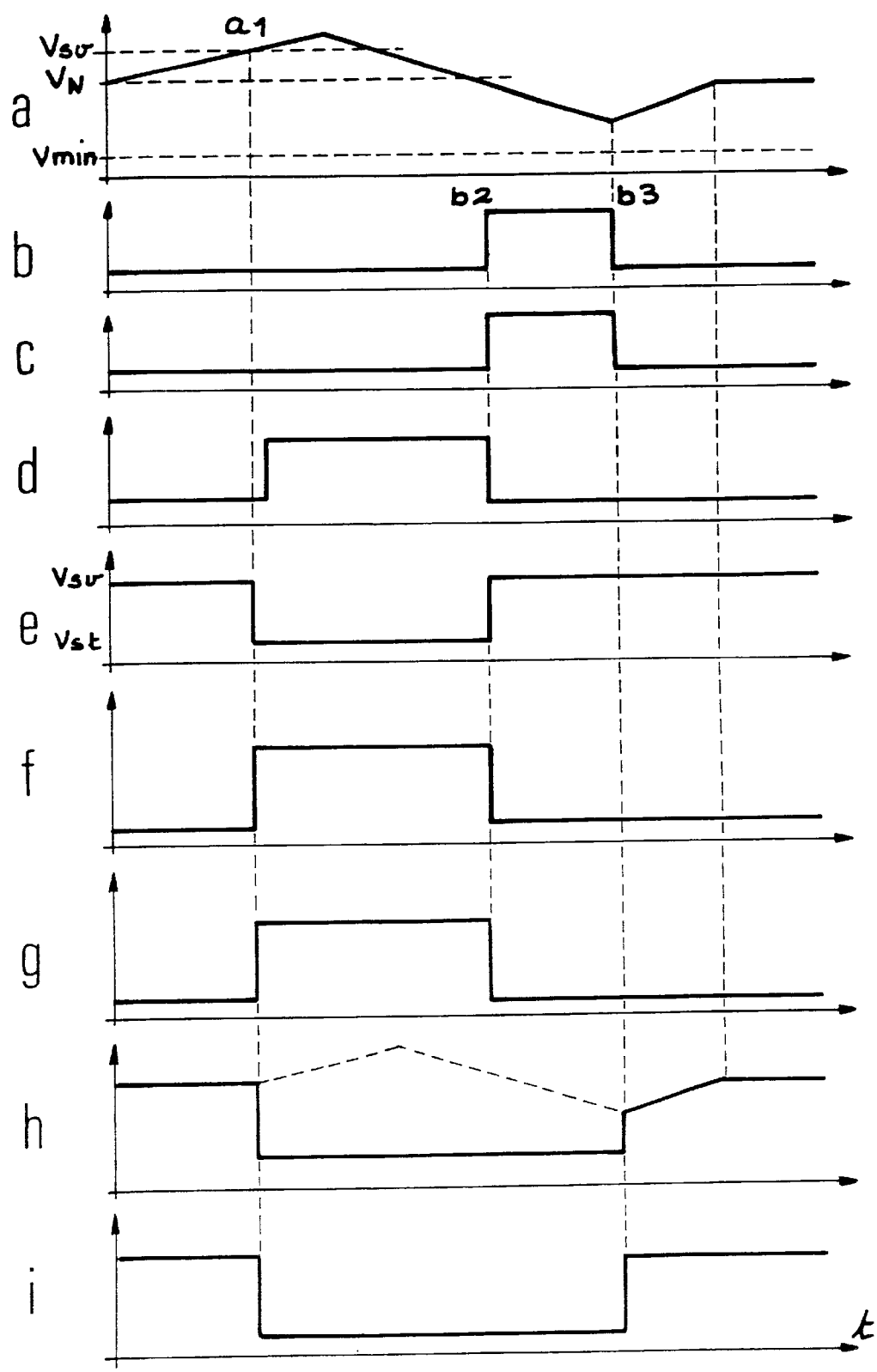
FIG. 7 shows a stop in flight sequence after the overspeed protection has been tripped and then re-ignition without a test if requested by the pilot.

We will now describe the operation of an engine stop sequence in flight after the overspeed protection has been tripped, followed by re-ignition without test when requested by the pilot, with relation to FIG. 7.

Firstly, it is assumed that the rotation speed reaches the overspeed threshold at time al, line a, for any reason whatsoever. In module 120, the response to the question "N2>threshold?" in comparison module 122 becomes positive, an open command 125 is sent to the overspeed electro-valve 14 and the overspeed electro-valve changes from the closed position to the open position, lines f and g, the plug 23 of the delivery pump 18 line h is moved to the minimum stop position and consequently, the stop check valve 2, line i, changes from the open position to the closed position. The position that the plug 23 of the delivery pump 18, line h, would have had in response to the computer set values is shown in dashed line; it is a function of the real engine rotation speed. The engine is no longer supplied with fuel and consequently the rotation speed drops after passing through a maximum, line a.

The fact that the response to the question "N2>threshold" in module 122 is positive, also sends a positive signal to the input 141 to the "and" gate 139. Since the aircraft is in flight, a positive signal is also received on the second input 138 through the "or" gate 136 and its input 137. The state switch, line d, then changes at time a1 from state 0 to state 1. Consequently, the overspeed detection threshold is corrected from its real overspeed value to its test overspeed value. Consequently, the engine is not reignited, even when the engine rotation speed drops again due to closure of the fuel inlet to a speed less than the overspeed threshold.

Re-ignition of the engine requires a two-fold action by the pilot. Firstly, he must switch off the engine by moving the master lever, and secondly he must control ignition of the engine by moving the master lever again.

We will now assume that these two actions are performed at times b2 and b3 respectively, line b.

The pilot memento specifies that re-ignition of the engine in flight is only authorized if the rotation speed exceeds a threshold $V_{min}$. This threshold is the speed starting from which the fuel can supply injectors, in flight.

This threshold speed is about 6% of the full gas rotation speed allowable for current conditions in flight.

At time b2, the engine cutoff results in aircraft electrical signals changing from the off position to the on position, line c. The result is that the cutoff in stop electro-valve 16 receives an open command 151 and opens (line c). The state switch 142, when it receives this command 151 is reinitialized and changes from position 1 to position 0 (line d). The result is that the overspeed comparison threshold module 121 returns to the real overspeed, line e. Consequently, the rotation speed drops below the threshold, the output from module 122 becomes negative and the overspeed electro-valve 14 receives a close signal, line f, and changes to the closed position, line g. The result is that there is no change in the position of the plug 23 of the delivery pump 18 that remains in the minimum stop position, line h, since the cutoff in stop electro-valve 16 is open. Therefore, the same is true for the position of the stop check valve 2 that remains closed, line i.

Therefore, moving the master lever has the effect of reinitializing the position of the equipment elements 14, 16, 18, 20 of the system to put them into the normal closed position for the engine , similarly for logical elements 121, 123, 124 and 143.

At time b2, the pilot once again trips the position of the master lever. The result is that the aircraft electrical signal, line b, changes from on to off. The command 151 received by the cutoff on stop electro-valve 16 closes this valve, line c.

The state switch 143, line d, does not change position since the "and" gate 139 does not receive two positive inputs. The first 138 is positive, since the aircraft was in flight, this information is transmitted through the "or" gate 136 that receives this information on its first input 137. However, the second input 141 received from module 122 is negative since the engine rotation speed is less than the threshold speed.

Consequently, the overspeed detection threshold, line e, does not change and remains fixed at the real overspeed (line e). The command signal from the overspeed electro-valve 14 does not change, line f, nor does the position of this electro-valve, line g, that remains closed.

Since valves 14 and 16 are now closed, the plug 23 of feed regulator 18 leaves the minimum stop position and returns to a set position controlled by servovalves 21, line h. The result is that stop valve 2 opens, line 1, and fuel is re-ignited at injectors, line i. The engine rotation speed returns to its normal level, line a.

In summary, module 140 manages the state switch redundantly to put it into the test state if:

the aircraft is on the ground and the ignition control is put into the on position;

the aircraft is in flight, the real overspeed threshold has been exceeded, module 140 placing the state switch in its normal state if;

with the aircraft on the ground and the ignition control in the on position, the engine rotation speed becoming greater than a speed $V_a$ starting from which fuel can be sent to the injectors, this speed $V_a$ being greater than the test overspeed threshold $V_{st}$, or if the aircraft was in flight and the state switch was in the test state following an overspeed, the ignition control 151 is switched from a "on" position to a off position.

Note also that in test cases, correct operation is tested by the difference between a calculated position of the plug of the feed regulator 18, and a real position in the minimum stop position sensed by sensors 22. This difference is dealt with in a manner well known to an expert in the subject, and can be displayed or processed in an aircraft computer or an engine computer. This method of characterizing satisfactory operation satisfies the desire to modify a minimum number of existing items of equipment to arrive at the required result. Position sensors 22 exist, and the calculated position of the plug 23 of the feed regulator 18 also exists. However, note that the same result could have been obtained by a signal originating directly from the check valve 2, this signal indicating whether the valve is open or closed.

What is claimed is:

1. A device for controlling and testing an aircraft engine cutoff-on-stop system, comprising:
   a fuel feed regulator configured to output an allowable fuel flow for input to engine fuel injectors, the allowable fuel flow being determined in accordance with a control signal received from the engine;
   a sensor configured to determine an instantaneous real fuel flow from the fuel feed regulator to the engine fuel injectors; and
   a cutoff valve configured to cut off the allowable fuel flow from the fuel feed regulator from reaching the engine fuel injectors, in response to a fuel cut-off command determined by a position of a master lever;
   wherein a correct operational test of the cutoff-on-stop system includes detecting a difference between the allowable fuel flow and the instantaneous real fuel flow measured by the sensor.

2. The device of claim 1, further comprising:
   an electro-valve that opens in response to the fuel cutoff command, so as to release a pressure to operate the cutoff valve.

3. An overspeed protection device for an aircraft engine, comprising:
   a fuel feed regulator configured to output an allowable fuel flow for input to engine fuel injectors, the allowable fuel flow being determined in accordance with a control signal received from the engine;
   a sensor configured to determine an instantaneous real fuel flow from the fuel feed regulator to the engine fuel injectors;
   a state switch adapted to be in a test state or a normal state;
   an overspeed unit, configured to receive a signal indicating a real instantaneous rotation speed of the engine, to compare the real instantaneous rotation speed with a test overspeed threshold when the state switch is in the test state, to compare the real instantaneous rotation speed with a real overspeed threshold when the state switch is in the normal state, and to output an overspeed cutoff command when a real engine overspeed or a test engine overspeed is detected; and
   a cutoff valve configured to cut off the allowable fuel flow from the fuel feed regulator from reaching the engine fuel injectors, in response to the overspeed cutoff command;
   wherein a correct operation test of the overspeed protection device includes detecting a difference between the allowable fuel flow and the instantaneous real fuel flow measured by the sensor.

4. The device of claim 3, further comprising:
   an electro-valve that opens in response to the overspeed cutoff command, so as to release a pressure to operate the cutoff valve.

5. The device of claim 3, wherein:
   a) the device comprises a logic module that is configured to manage the state switch in accordance with:
      1) the signal indicating the real instantaneous rotation speed of the engine;
      2) flight phase information indicating whether the aircraft is on the ground or in flight; and
      3) engine ignition control position information indicating whether the ignition control is in an on position or an off position;
   b) the logic module is configured to store speed threshold values including:
      1) a real overspeed threshold;
      2) a test overspeed threshold $V_{st}$; and
      3) a speed $V_a$ starting from which fuel can be sent to the engine fuel injectors, the speed $V_a$ being greater than the test overspeed threshold $V_{st}$;
   c) the logic control module puts the switch into its test state if:
      1) the aircraft is on the ground and the ignitioin control is in the on position; or
      2) the aircraft is in flight and the real overspeed threshold has been exceeded; and
   d) the logic module puts the state switch into its normal state if:
      1) the aircraft is on the ground, the ignition control in the on position, the engine rotation speed becomes greater than the speed $V_a$; or
      2) the aircraft is in flight and the state switch is in the test state following an overspeed, and the engine ignitioin control is switched from the on position to the off position.

6. A device for the control and test of a cutoff-on-stop and overspeed protection system for an aircraft engine, comprising:
   a fuel feed regulator congfigured to output an allowable fuel flow for input to engine fuel injectors, the allowable fuel flow being deermined in accordance with a control signal received from the engine;
   a sensor configured to determine an instantaneous real fuel flow from the fuel feed regulator to the engine fuel injectors;
   a state switch adapted to be in a test state or a normal state;
   an overspeed unit, configured to receive a signal indicating a real instantaneous rotation speed of the engine, to compare the real instantaneous rotation speed with a test overspeed threshold when the state switch is in the test state, to compare the real instantaneous rotation speed with a real overspeed threshold when the state switch is in the normal state, and to output an overspeed cutoff command when a real engine overspeed or a test engine overspeed is detected; and
   a cutoff valve configured to cut off the allowable fuel flow from the fuel feed regulator from reaching the engine fuel injectors, in response to the overspeed cutoff command or in response to a fuel cut-off command determined by a position of a master lever;
   wherein a correct operational test of the cutoff-on-stop system and a correct operation test of the overspeed protection device each includes detecting a difference between the allowable fuel flow and the instantaneous real fuel flow measured by the sensor.

7. The device of claim 6, further comprising:

an electro-valve that opens in response to the fuel cutoff command, so as to release a pressure to operate the cutoff valve.

8. The device of claim 7, wherein:

a) the device comprises a logic module that is configured to manage the state switch in accordance with:
   1) the signal indicating the real instantaneous rotation speed of the engine;
   2) flight phase information indicating whether the aircraft is on the ground or in flight; and
   3) engine ignition control position information indicating whether the ignition control is in an on position or an off position;

b) the logic module is configured to store speed threshold values including:
   1) a real overspeed threshold;
   2) a test overspeed threshold Vst; and
   3) a speed $V_a$ starting from which fuel can be sent to the engine fuel injectors, the speed $V_a$ being greater than the test overspeed threshold $V_{st}$;

c) the logic control module puts the switch into its test state if:
   1) the aircraft is on the ground and the ignition control is in the on position; or
   2) the aircraft is in flight and the real overspeed threshold has been exceeded; and d) the logic module puts the state switch into its normal state if:
   1) the aircraft is on the ground, the ignition control in the on position, the engine rotation speed becomes greater than the speed $V_a$; or
   2) the aircraft is in flight and the state switch is in the test state following an overspeed, and the engine ignition control is switched from the on position to the off position.

9. The device of claim 6, further comprising:

an electro-valve that opens in response to the overspeed cutoff command, so as to release a pressure to operate the cutoff valve.

* * * * *